United States Patent [19]

Scheyhing et al.

[11] Patent Number: 5,653,475
[45] Date of Patent: Aug. 5, 1997

[54] COLLANT COUPLING FOR CONNECTING COOLANT LINES

[75] Inventors: Ulrich Scheyhing, Winnenden; Thomas Holzer, Backnang; Mathias Behr, Murrhardt; Horst Hunn, Muehlacker, all of Germany

[73] Assignee: Kuehner GmbH & CIE, Germany

[21] Appl. No.: 664,259

[22] Filed: Jun. 7, 1996

Related U.S. Application Data

[63] Continuation of Ser. No. 255,876, Jun. 8, 1994.

[30] Foreign Application Priority Data

Jun. 8, 1993 [DE] Germany .............. 43 18 878.8
May 20, 1994 [DE] Germany .............. 94107810.7

[51] Int. Cl.$^6$ .................................................. F16L 37/26
[52] U.S. Cl. ...................... 285/54; 285/351; 285/305; 285/319; 285/308; 285/374; 285/379
[58] Field of Search .............................. 285/305, 54, 308, 285/351, 319, 39, 918, 374, 375, 347, 349, 356, 379

[56] References Cited

U.S. PATENT DOCUMENTS

| | | | |
|---|---|---|---|
| 2,479,711 | 8/1949 | Arutunoff | 285/918 |
| 2,485,976 | 10/1949 | Main | 285/918 |
| 2,590,565 | 3/1952 | Osborn . | |
| 2,661,967 | 12/1953 | Mitcneu | 285/918 |
| 3,990,727 | 11/1976 | Gallagher . | |
| 4,123,090 | 10/1978 | Kotsakis et al. | 285/340 |
| 4,174,124 | 11/1979 | Dockree | 285/54 |
| 4,294,473 | 10/1981 | Ekman | 285/356 |
| 4,345,468 | 8/1982 | Jackson | 73/329 |
| 4,600,221 | 7/1986 | Bimba . | |
| 4,691,943 | 9/1987 | DeLand et al. . | |
| 4,715,624 | 12/1987 | Frye | 285/351 |
| 4,869,534 | 9/1989 | Ketcham et al. . | |
| 4,874,174 | 10/1989 | Kojima et al. . | |
| 4,881,760 | 11/1989 | Runkles et al. . | |
| 4,921,282 | 5/1990 | Meisinger | 285/351 |
| 4,927,185 | 5/1990 | McNaughton | 285/319 |
| 4,946,205 | 8/1990 | Washizu | 285/79 |
| 5,090,747 | 2/1992 | Kotake | 285/319 |
| 5,127,682 | 7/1992 | Washizu | 285/319 |
| 5,374,088 | 12/1994 | Moretti et al. | 285/319 |
| 5,405,175 | 4/1995 | Bonnah, II et al. | 285/305 |
| 5,415,825 | 5/1995 | Sellers | 285/319 |
| 5,421,622 | 6/1995 | Godeau | 285/351 |

FOREIGN PATENT DOCUMENTS

| | | | |
|---|---|---|---|
| 363743 | 8/1981 | Australia . | |
| 0444523A3 | 9/1991 | European Pat. Off. . | |
| 909478 | 5/1946 | France . | |
| 1195419 | 11/1959 | France | 285/374 |
| 2 291 438 | 11/1975 | France . | |
| 3143015C2 | 6/1982 | Germany . | |
| 35 02 424 | 7/1986 | Germany . | |
| 3502424A1 | 7/1986 | Germany . | |
| 89 04 555.6 | 7/1989 | Germany . | |
| 31 43 015 | 5/1993 | Germany . | |
| 1665161 | 7/1991 | Switzerland . | |
| 840220 | 7/1960 | United Kingdom | 285/918 |
| 210322 | 2/1983 | United Kingdom . | |

*Primary Examiner*—Eric K. Nicholson
*Attorney, Agent, or Firm*—Evenson, McKeown, Edwards & Lenahan P.L.L.C.

[57] ABSTRACT

In prior art coolant couplings, multiple parts are provided for guiding and supporting a connector plug in a connector sleeve and for sealing off the connection between the plug and the sleeve. According to the invention, the support function, sealing function and centering function in a connection between a plug and a sleeve of a coolant coupling are integrated in a single component in the form of an annular combination element.

20 Claims, 3 Drawing Sheets

COLLANT COUPLING FOR CONNECTING COOLANT LINES

This application is a continuation of application Ser. No. 08/255,876, filed on Jun. 8, 1994.

BACKGROUND AND SUMMARY OF THE INVENTION

The invention relates to a coolant coupling for connecting coolant lines, particularly for use in motor vehicles, having two interlockable connectors in the form of a plug on the one hand and a sleeve on the other that can being sealed off from one another by means of at least one sealing element, which connectors can be axially secured by a closure arrangement in an interlocked position.

German Published Patent Disclosure DE 35 02 424 A1 discloses a coolant coupling for motor vehicle air conditioning systems that is provided with a plug-type connection. For connecting two pipes of a coolant line, one connector is provided with a receiving piece, serving as a sleeve, which has a widened end region. The other connector is provided with an insertion piece, acting as a plug, which is insertable with a precise fit into the receiving neck. The inside wall of the receiving neck and the outer periphery of the insertion neck rest on one another. To improve the sealing action between the insertion neck and the receiving neck, encompassing sealing rings are provided between them. To enable axially securing the two joints in the interlocked position, a closure arrangement in the form of a clamping ring is provided, which is reinforced by a spiral spring acting in the circumferential direction. An axially resilient element that is compressible axially by the clamping ring and is disposed between radially outward-protruding flanges of the insertion neck and receiving neck, serves as a means of preventing relative rotation for the connectors.

U.S. Pat. No. 2,590,565 discloses a fast-action coupling for connecting pipelines, in which one connector, serving as a plug and provided with a conically widened region, is insertable into the other connector, acting as a sleeve and provided with an expanded region. The connection between the two connectors is sealed off by an elastic sealing ring, which is disposed radially between the conically widening region of the plug and the widened region of the sleeve and extends axially over virtually the entire length of the conically widened region of the plug. To secure the interlocked position, a securing ring that engages a stop collar of the plug axially from behind is provided.

German Patent Document DE 31 43 015 C2 discloses a fast-action coupling for connecting coolant lines for use in motor vehicles, in which the two connectors of the coolant lines are embodied as a plug and sleeve, respectively, and can be interlocked axially. The plug is provided with a conically widening collar. The sleeve is widened cylindrically compared with the diameter of the plug. To avoid galvanic corrosion, the plug and sleeve are interlocked in a radially spaced-apart manner, by the interposition of a spacer, an elastic sealing ring and a bush. The bush and the spacer serve to guide and support the plug in the sleeve, to stabilize the connection between the two coolant lines; this sealing ring serves to seal off the connection of the two connectors. Like the sealing ring, which is made of an elastomer, the bush and the spacer are produced from electrically nonconductive material.

An object of the invention is to provide a coolant coupling of the type referred to at the outset that is simple and reliable to assemble and that by simple means assures secure sealing action and a stable connection between the coolant lines.

This object is attained by providing an annular combination element of a nonconductive material between the plug and the sleeve, which combination element keeps the plug radially centered and axially positioned in the sleeve, without contact between the plug and sleeve, and essentially positively fills up the annular space over the insertion length of the plug and the sleeve in order to stably support the plug in the sleeve, and in which combination element the at least one sealing element is integrated. As sealing elements, sealing rings embodied as O-rings, encompassing sealing lips, and sealing ligaments are provided in particular. As a result, the combination element is merely a single component, yet in which three essential functions are combined. First, the combination element serves to seal off the connection between the coolant lines, and the disposition of the plug in the sleeve attains a sealing action that remains the same over the entire circumference. The integration of sealing elements with the combination element means that the sealing elements are connected as separate elements with the combination element in a force locking and/or form locking manner. By the placement or inclusion of the sealing elements in suitable indentations or annular grooves of the combination element, or by already integrally forming the sealing elements onto the combination element when it is produced, particularly by injection molding or the like, a secure integration of the combination element and sealing elements is achieved. Because the nonconductive combination element keeps the plug in the sleeve without its touching the sleeve, corrosion in the case of metal joints is effectively avoided. In addition to the sealing action and centering action, the combination element also has a support function for the coupling, since it essentially positively fills up the annular space over the insertion length of the plug and sleeve. This supporting action produces a compact, stable connection between the two coolant lines, and as a result strains during motor vehicle travel can also be absorbed by the coolant coupling, without a change in the positioning of the plug and sleeve relative to one another that could cause impaired sealing action.

Contact corrosion is effectively avoided thereby, particularly in the case of metal pipes. In contrast to the prior art, only a single component, namely the combination element, is provided, while in the prior art exemplified by German Patent Document DE 31 43 015 C2, three different elements are necessary to achieve adequate sealing and supporting action, namely the spacer, the sealing ring and the bush. In the preferred embodiments according to the invention, simple and fast assembly are attained, with high accuracy and stability of the resultant connection. The coolant coupling according to the invention is therefore particularly suitable for air conditioning systems in the engine compartment of motor vehicles, in which relatively high strains are exerted on the coolant coupling when the vehicle is in operation.

In certain preferred embodiments of the invention, the annular combination element is made of plastic, can be fitted lockingly and tightly on its outer periphery into a receiving region of the sleeve, and is provided on its inside periphery with at least two encompassing sealing elements that are axially offset from one another. In various exemplary embodiments of the invention, the positive (or form locking), tight fitting into the receiving region of the sleeve is done by gluing, press-fitting, or insertion, in combination with the provision of encompassing sealing rings or sealing lips on the outer circumference of the combination element that assure a tight, positive seat in the sleeve.

By the disposition of two encompassing sealing elements on the inside circumference of the annular combination element, axially spaced apart from one another, improved equalization of tolerances is possible, compared with only one sealing element, and as a result, secure sealing action is attained.

In a further feature of the preferred embodiments of invention, the closure arrangement is provided with a closure ring held axially positively on the sleeve, a closure clamp is bound in captive fashion in the ring; this clamp can be radially spread apart for the sake of axial insertion and removal of the plug, and it positively locks the plug axially in the sleeve in the interlocked position. It is therefore possible for two connectors, inserted one in the other as a plug and sleeve, of two coolant lines to be secured in the interlocked position and locked there. Loosening of the connection is reliably avoided thereby. It is assured that the closure clamp cannot be lost even after disassembly, and thus the closure arrangement is functional at all times.

In a further feature of preferred embodiments of the invention, the closure clamp is embodied as a spring that is provided with a closed cross section and that in the assembled state encompasses the plug, the spring being supported on an inside wall of the closure ring and having at least one engagement element, accessible from an outside of the closure ring, for loosening the closure clamp. The closure clamp is accordingly retained in captive fashion in the closure ring in both the assembled and disassembled state of the closure ring, and from its position in which it axially engages the plug from behind it can be spread apart in a simple way from the outside of the closure ring, by engaging the applicable engagement element with a hand or a tool, far enough that the plug is released in the axial direction.

In a further feature of preferred embodiments of the invention, as the engagement elements, two engagement protrusions are provided on two opposed sides of the spring ring, which protrusions protrude radially to the outside through the wall of the closure ring. As a result, the engagement protrusions are pressed radially inward in a simple way from the two opposed sides of the closure ring, and as a result the connection between the two joints is loosened. In a further feature of the invention, a half-shell-like disassembly tool is provided, which can be seated on the closure ring and which for loosening the spring is provided with two cams protruding radially inward at the height of the engagement protrusions. When the disassembly tool is seated on the closure ring, the two cams press into the opening of the closure ring for the engagement protrusions, and as a result the engagement protrusions are pressed inward. By the spreading apart of the spring, the connection between the plug and sleeve is loosened in a simple way.

In a further feature of preferred embodiments of the invention, the disassembly tool is provided with a collarlike guard edge for positive axial securing of the plug during disassembly, which edge protrudes radially inward to beyond the radial height of a plug collar of the plug and which in the seated state, is disposed with axial spacing from the plug collar. In operation, coolant lines are under high pressure. When the coolant coupling is disassembled, in order to avoid having the plug pressed suddenly axially rearward in an uncontrolled fashion by the high pressure in the coolant lines after the closure clamp is loosened, the guard edge is provided, which catches the plug and keeps it in a loosened position relative to the sleeve.

In a further feature of preferred embodiments of the invention, the axial spacing is less than the axial length of the combination element. This assures that the plug will be kept positioned in the region of the sleeve even after being loosened.

In a further feature of preferred embodiments of the invention, the two half-shells are pivotably joined together on one side by means of a hinge connection, and on the opposite side they can be annularly closed by means of a detent connection. As a result, the two half-shells can be slipped over the sleeve in the folded-open position and pressed together, so that they fit over the sleeve. Disassembly is done in reverse fashion.

In a further feature of preferred embodiments of the invention, the hinge connection has at least two detent elements which can lock in detent fashion positively with one another and are pivotable relative to one another, one being disposed on the one and the other being disposed on the other half-shell. This creates a hinge clip connection that is simple to produce and that enables fast assembly and disassembly.

In a further feature of preferred embodiments of the invention the closure clamp is embodied as an essentially U-shaped, elastically spreadable bail. The closure clamp is held in the closure ring in the assembled stage so that it can be radially spread apart in a radial plane to a center longitudinal axis of the coolant coupling; the amount of spreadability is equivalent to at least the maximum diameter of the plug. When the plug is thrust into the sleeve, a suitably conically widened portion of the plug therefore presses the closure clamp apart until, behind the collar of this widened portion, it snaps back inward again and axially secures the plug. This enables one-handed assembly; in other words, the coolant coupling can be put together by robot assembly.

In a further feature of preferred embodiments of the invention, the U-shaped bail is provided with an outward bulge serving as an engagement face for a tool. By means of a suitable tool, the closure clamp can therefore be removed with a fast manual operation.

In a further feature of preferred embodiments of the invention, the closure clamp is retained in countersunk fashion in the closure ring, and the free ends of the U-shaped bail of the closure clamp are accessible by means of a tool through two openings in the closure ring. This prevents unauthorized loosening of the closure clamp, because the clamp cannot be accessed or disassembled except with a tool.

In a further feature of preferred embodiments of the invention, the closure arrangement has a positive relative-rotation-preventing means, for connecting the plug and sleeve in a defined position. In a simple way, protrusions and grooves that engage one another accordingly are provided on the closure ring and on the associated collar of the plug or sleeve.

Other objects, advantages and novel features of the present invention will become apparent from the following detailed description of the invention when considered in conjunction with the accompanying drawings.

DETAILED DESCRIPTION OF THE DRAWINGS

Figure 1:
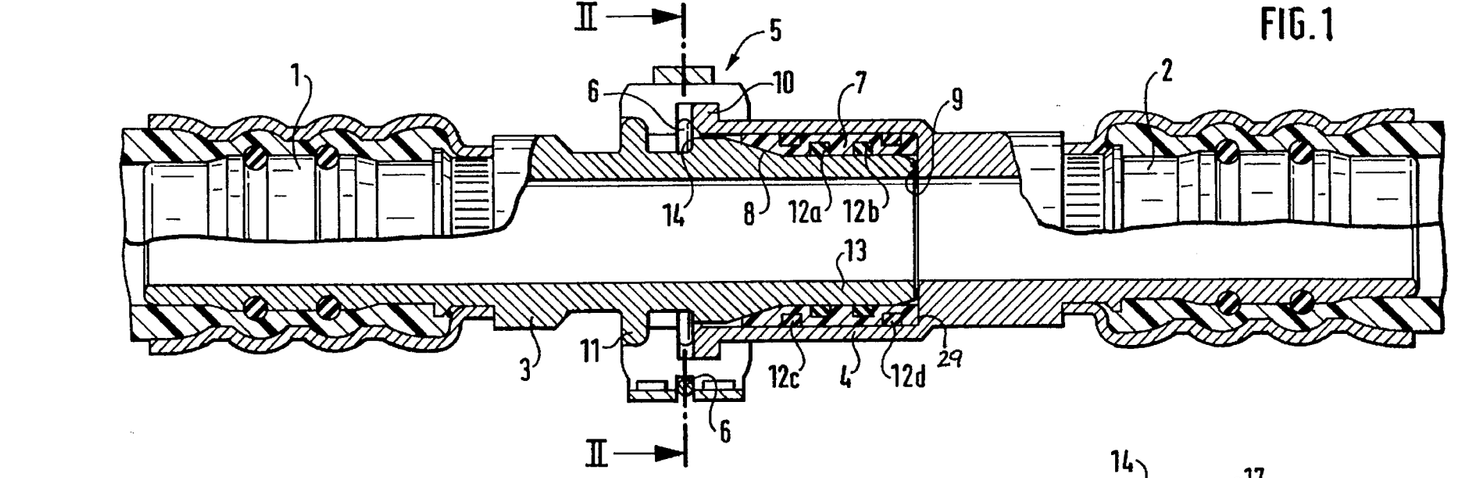
FIG. 1 is a sectional view of an embodiment of a coolant coupling according to the invention, wherein a combination ring serving to seal, center and support the connection between the two connectors is provided between the plug and sleeve of the two connectors.

A coolant coupling in the form of a fast-action coupling according to FIG. 1, for connecting two pipes (1, 2) serving as coolant lines, is provided for the connection of coolant lines in a motor vehicle air conditioning system. The pipeline (1) has a necklike joint or connector, made of metal, which is embodied as a plug (3) for the fast-action coupling as the coolant coupling. On its free end, the plug (3) has a cylindrical pipe segment (13), which is adjoined in the axial direction toward the pipeline (1) by a conically widening insertion collar (8). The insertion collar (8) is extended onward, toward the pipeline (1), forming a radially inwardly oriented termination edge (14), to make a cylindrical segment not identified by reference numeral. This cylindrical segment is adjoined by a protective collar (11) that protrudes radially outward and whose function will be described in further detail hereinafter. The metal connector is tightly joined in a manner known per se with a hose of the pipeline (1).

The opposite coolant line (2), on its end, has a likewise necklike metal joint or connector that is embodied as a sleeve (4). The sleeve (4) has a bell-shaped receiving region with a cylindrical inner wall that in the assembled state of the coolant coupling as shown in FIG. 1 axially fits over the plug (3) but is spaced apart radially from it. The sleeve (4) of FIG. 1 is a turned part, in which the bell-like receiving region is hollowed out on the inside. The bell-like receiving region has a substantially enlarged inside diameter compared with the adjacent region toward the coolant line (2). The inner wall of the bell-like receiving region is graduated, compared with the cylindrical region of smaller inside diameter, by means of an encompassing radial stop edge (9). The inside diameter of the plug edge (3) is equivalent to the inside diameter of the adjoining cylindrical region of the sleeve (4) toward the coolant line (2). The free end of the bell-like receiving region of the sleeve (4) is formed by a radially outward-protruding collar (10). The axial length of the receiving region of the sleeve (4) is equivalent to the axial length of the cylindrical pipe segment (13) as well as the adjoining insertion collar (8), as far as the termination edge (14) of the plug (3). The inside diameter of the receiving region of the sleeve (4) is somewhat larger than the largest outside diameter of the insertion collar (8).

In the interlocked state as shown in FIG. 1, an annular hollow space results between the conical portion of the insertion collar (8) of the plug (3) and the radial stop edge (9) of the sleeve (4), and this space is positively filled by a combination ring (7) that represents an annular combination element. The combination ring (7) is made of a nonconductive material, in the exemplary embodiment a polyamide plastic. The combination ring (7) is a rotationally symmetrical element and is provided with a cylindrical outer wall. The combination ring (7) essentially has a cylindrical inner wall, which is provided only in the region of one face end with a conically widened segment (28), whose inclination and length are adapted to the conical segment of the insertion collar (8) of the plug (3). The inside diameter of the cylindrical inner wall is adapted to the outside diameter of the cylindrical pipe segment (13) of the plug (3). The outside diameter of the outer wall of the combination ring (7) is correspondingly adapted to the bell-like receiving region of the sleeve (4). The combination ring (7) has two annular outer grooves (26), axially offset from one another, and two annular inner grooves (27), likewise axially offset from one another; both the outer grooves (26) and the inner grooves (27) are embodied as annular grooves having the same cross section. The annular grooves (26) are also offset from the inner grooves (27), and as a result the thickness of the combination ring (7) can be kept smaller than twice the radial depth of the outer or inner grooves (26, 27). These annular grooves serve to receive elastic sealing rings (12a, 12b, 12c, 12d), which are simple O-rings made of suitable elastic materials. The combination ring (7) has a relatively rigid material, so that it gains good stability. On the face end opposite the conical segment (28), the combination ring (7) has an end edge (29), which in the assembled state of the combination ring (7) is pressed against the stop edge (9) of the sleeve (4). In this position, the combination ring (7) is held tightly by the two elastically compressed sealing rings (12c and 12d) in the receiving region of the sleeve (4) on one side. On the other side, the inward-protruding sealing rings (12a and 12b) clamp the cylindrical pipe segment (13) of the plug (3) and seal it off. Because the inner grooves (27) and sealing rings (12a, 12b) are disposed with axial spacing from one another, good tolerance equalization is assured with only a slight radial offset or in the event of tilting of the plug (3) in the sleeve (4), and this equalization also in this case guarantees secure sealing action. The plug (3), in the assembled position, is thrust far enough into the combination ring (7) that the conical segment of the insertion collar (8) comes to rest on the conical segment (28) of the combination ring (7). In that position, the free face end is virtually flush with the end edge (29) of the combination ring (7), while preserving a slight axial spacing from the stop edge (9). The plug (3) and the sleeve (4) are adapted to one another such that in the interlocked position of FIG. 1, the termination edge (14) is radially aligned with the free end edge of the collar (10).

Figure 4:
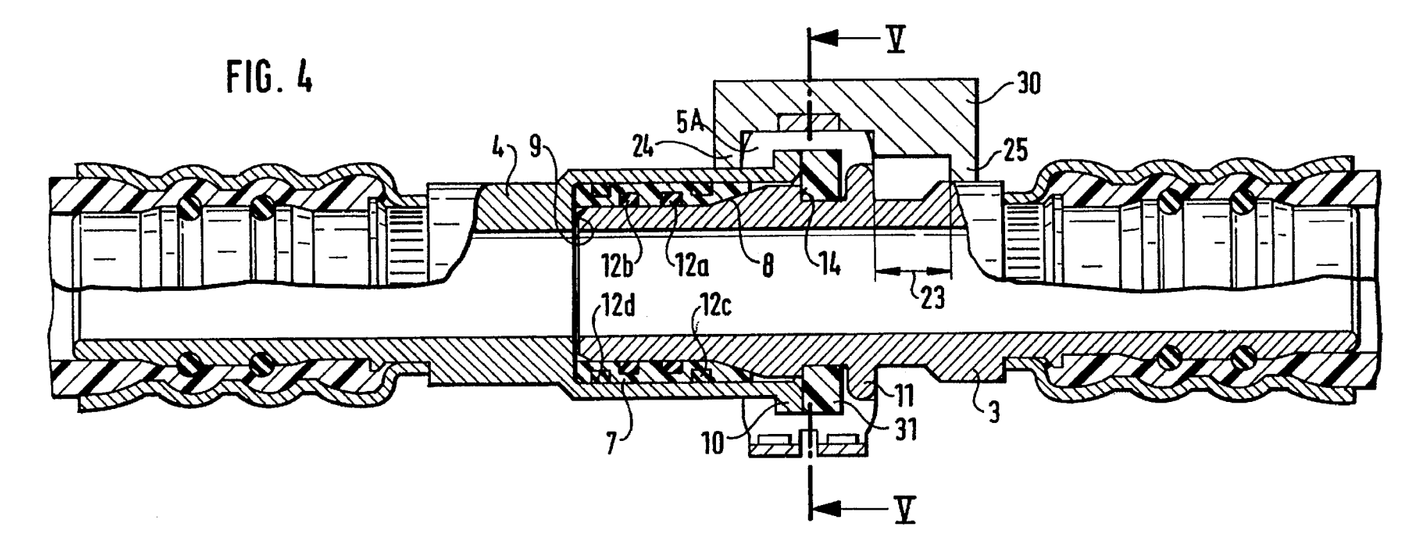
FIG. 4, is a sectional view similar to FIG. 1, showing a further embodiment of a coolant coupling, in which the closure ring is provided with an integrated spring ring as the closure clamp and on which a disassembly tool is seated.
Figure 7:
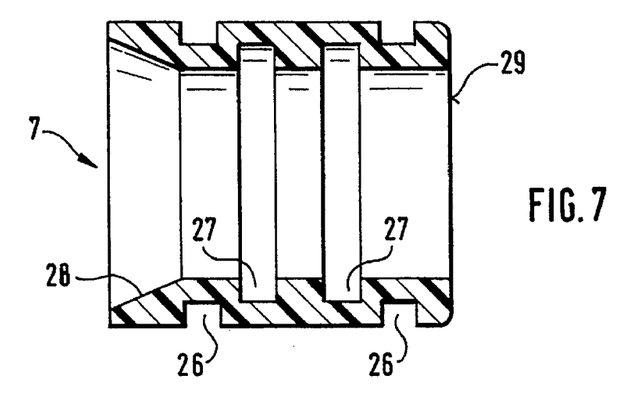
FIG. 7, on a larger scale, shows a section through the combination ring of FIGS. 1 and 4, but not showing the integrated sealing rings.

The combination ring (7) of FIGS. 1, 4 and 7 performs a plurality of functions within the fast-action coupling. First, it centers the plug (3) radially in the sleeve (4) in such a way that the insertion collar (8) has the same radial spacing from the inside wall of the receiving region of the sleeve (4) all the way around, so that non contact corrosion between the metal materials of the plug (3) and sleeve (4) cannot occur. Since the combination ring (7) virtually completely, positively fills the free annular space between the sleeve (4) and the plug (3) and has adequate stability, it provides stable support of the plug (3) in the sleeve (4), so that the interlocked position effected upon assembly can be maintained reliably and accurately, even if strains on the coolant coupling occur. Wobbling or canting of the plug (3) in the sleeve (4), which could cause sealing problems or contact corrosion, is averted by this supporting function. Moreover, the combination ring (7) also makes a substantial contribution to enabling the plug (3) to be positioned so exactly in the sleeve (4) that the termination edge (14) is radially aligned with the face end of the collar (10), yet on the other hand the free face end of the plug (3) does not touch the stop edge (9) of the sleeve (4). Moreover, as a result of the sealing rings (12) integrated with the combination ring (7), the combination ring (7) seals off the connection between the plug (3) and the sleeve (4).

Figure 2:
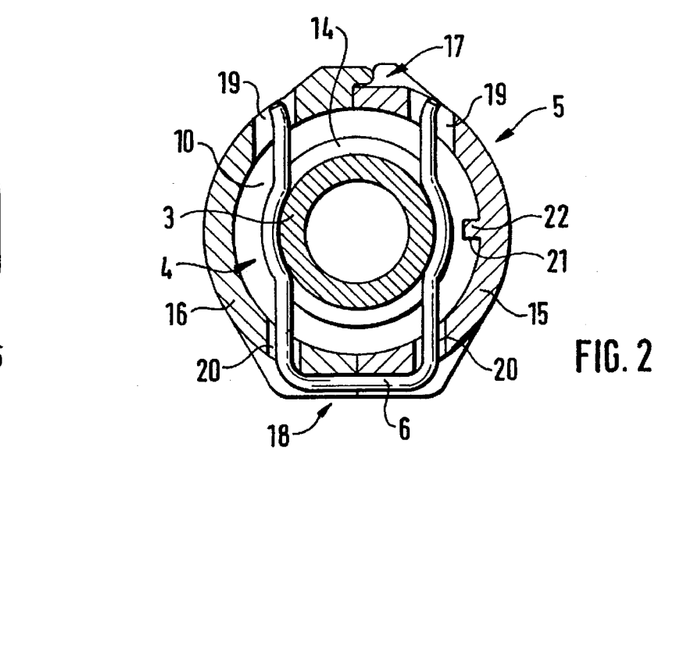
FIG. 2 shows across section through the coolant coupling of FIG. 1 along the line II—II in FIG. 1, at the level of a closure ring for securing the interlocked position of the plug and sleeve.

To lock this interlocked position of the plug (3) and sleeve (4), a closure arrangement in the form of a closure ring (5) is provided, which in the assembled state is provided with a closure clamp (6) (FIG. 2). The closure ring (5) and closure clamp (6) will now be described in detail. The closure ring (5) (FIG. 3) has two half-shells (15 and 16), which are pivotably joined together by means of a hinge clip connection (17), about a hinge axis that is parallel to the longitudinal axis of the coolant coupling. A hinge element that is open toward one side is formed onto the half-shell (15) and is provided with a detent opening. A corresponding detent protrusion is formed onto the other half-shell (16) and is pressed into the aforementioned detent opening. On the opposite side, the two half-shells (15 and 16) have detent elements for a detent connection (18); a detent hook is formed on the half-shell (16), and a corresponding detent recess is provided on the other half-shell (15). The two half-shells (15 and 16) are provided with grooves on their inside circumference that are adapted to the collar (10) of the sleeve (4) and to the protective collar (11) of the plug (3). For assembling the closure ring (5), the ring is simply placed in its folded-open stage with half of the ring against the collar (10) of the sleeve (4), and then the second half-shell is folded over onto the first, as a result of which the closure ring (5) encompasses the collar (10) over its entire circumference. As a result of the detent connection (18), the closure ring (5) is locked on the collar (10). The inside diameter of the closure ring (5) is somewhat greater than the outside diameter of the insertion collar (8) of the plug (3), so that the plug (3) is axially insertable into the sleeve (4) in a simple manner even when the closure ring (5) is seated on the sleeve (4). At that time, the combination ring (7) is then already in position either in the sleeve (4) or on the plug (3).

In order to axially secure the plug (3) in the interlocked position, a closure clamp (6) retained in the closure ring (5) is provided, the two legs of which fit around the termination edge (14) of the insertion collar (8) of the plug (3) on opposed sides in a radial plane to the center longitudinal axis of the coolant coupling. To that end, the two legs of the U-shaped closure clamp (6) (FIG. 2) are made to bulge out, each forming a respective curved securing region adapted to the outer contour of the cylindrical pipe segment (13) and of the cylindrical region of the plug (3) adjoining the termination edge (14). In the interlocked position, the securing regions of the closure clamps therefore engage the insertion collar (8) of the plug (3) from behind and axially fix the plug (3). Two openings (20) in the closure ring (5) are provided for inserting the closure clamp (6), and two further openings (19) are provided on the opposite side. The greater width of the openings (19) serve to equalize the elastic spreading apart of the closure clamp (6) that occurs when the plug (3) is inserted, because in the process the two legs are bent outward. Moreover, the openings (19) serve to provide access for a disassembly tool, since because of its offset position in the closure ring (5) the closure clamp (6) cannot be disassembled without a tool. By pressing against the face ends of the legs of the closure clamp (6), the clamp is pulled radially out of the closure ring (5). In the exemplary embodiment shown, the closure clamp (6) is made of spring wire. The radial insertion and retention plane of the closure clamp (6) in the closure ring (5) is adapted to the annular groove of the closure ring (5) such that in the interlocked position of the plug (3) and sleeve (4), the annular groove rests on one side axially on the collar (10), while on the other side the closure clamp (6) rests on the termination edge (14).

To assemble the coolant coupling, the closure ring (5) is first seated on the collar (10) of the sleeve (4), and the closure clamp (6) is inserted into the closure ring (5). If the combination ring (7) has already been positioned in the sleeve (4), then the plug (3) is now simply thrust into the closure ring (5) and into the sleeve (4). As the plug (3) is pressed inward, the conical segment of the insertion collar (8) presses the legs of the closure clamp (6) outward. As soon as the plug (3) has reached its final position in the sleeve (4), defined by the combination ring (4), the two legs of the closure clamp (6) lock elastically behind the insertion collar (8) of the plug (3) and axially support the stop edge (14) of the plug (3). This assembly of the plug (3) can easily be done with one hand. As a result, the coolant coupling can also be assembled automatically, for instance with a robot. This also makes it possible to provide the connector of the plug (3) directly with a pipe bend, which further expands the design options for the coolant loop.

At the level of the protective collar (11), the closure ring (5) has an annular groove whose diameter is adapted to that of the protective collar (11). In the assembled state, the protective collar (11) therefore rests axially on the annular groove in the insertion direction, and as a result the interior of the coolant coupling is closed and hence protected against becoming soiled.

Figure 3:
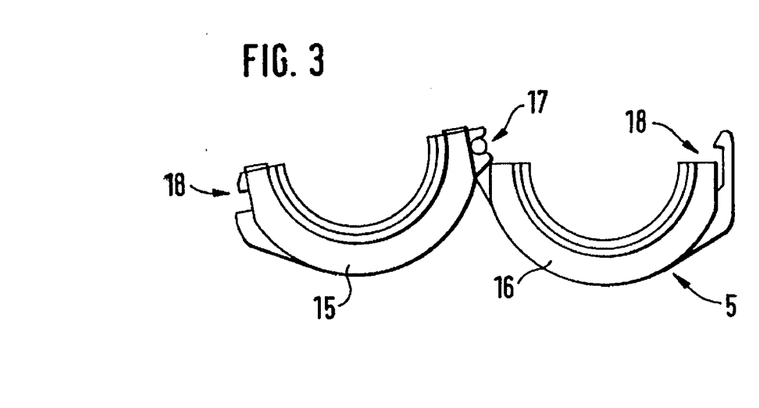
FIG. 3 shows the closure ring of FIG. 2, comprising two half-shells, in the folded-open state.
Figure 5:
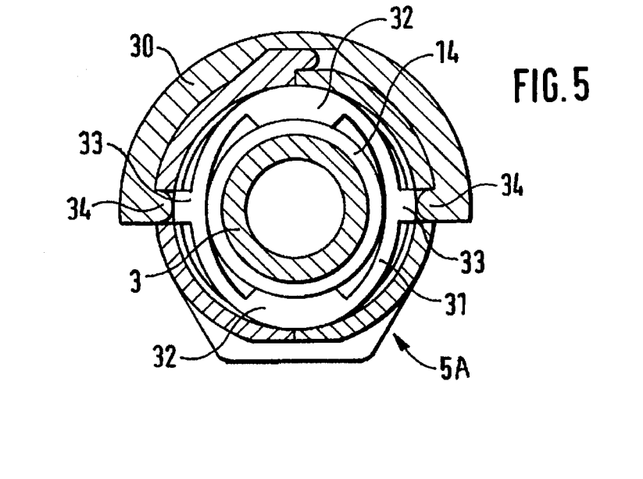
FIG. 5 shows a cross section through the coolant coupling of FIG. 4 along the line V—V of FIG. 4, in which the spring ring is spread open by the disassembly tool in order to release the plug.
Figure 6:
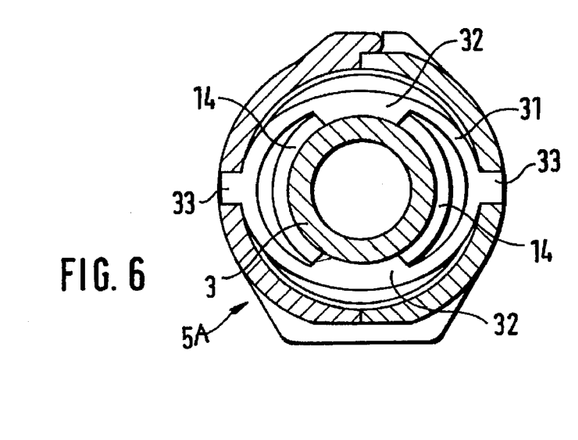
FIG. 6, in a cross section, shows the coolant coupling of FIGS. 4 and 5 without the disassembly tool, with the spring ring in the locked state.

In the exemplary embodiment of FIGS. 4 and 5, a disassembly tool (30) for loosening the plug (3) from the sleeve (4) is seated on a coolant coupling, similarly to what happens in FIGS. 1–3. In this exemplary embodiment of FIGS. 4–6, a closure ring (5A) for the coolant coupling is provided that performs similarly to the closure ring 5 of the embodiment of FIGS. 1–3 described above. However, an elastically spreadable closure clamp is integrated in captive fashion in this closure ring (5A) and is designed with a closed cross section. The closure clamp is designed in the form of an oval spring ring (31), which rests on two opposite sides on the inside wall of an annular groove for receiving the spring ring (31) in the closure ring (5A). In each of these regions, the closure ring (5A) is provided with a radially outwardly oriented opening, into which two engagement protrusions (33) of the spring ring (31) protrude radially outward. The oval spring ring (31) has two ligament-like securing tabs (32), protruding radially inward and offset by 90° from one another, which serves the purpose of axially supporting the termination edge (14) of the plug (3) in the assembled position. If the two engagement protrusions (33) of the spring ring (31) are now pressed radially inward, then the securing tabs (32) are correspondingly pressed elastically and radially outward, because of the spring forces involved. The securing tabs (32) are dimensioned such that the free cross section between the opposed securing tabs (32) in the spread-open position of the spring ring (31) is greater than the cross section of the insertion collar (8) of the plug (3), so that the plug (3) can be pulled axially out of the sleeve (4) and closure ring (5A). The disassembly tool (30) in the form of a half-shell-like body seated as in FIGS. 4 and 5 serves to spread open the spring ring (31). Tool 30 is provided with radially inward-pointing cams (34) at the level of the two openings in the closure ring (5A). To a certain extent, the disassembly tool (30) is elastically spreadable, so that when it is thrust onto the closure ring (5) it is spread open by the sliding of the two cams (34) along the outer circumference of the closure ring (5A), until the cams (34) engage the openings of the closure ring (5A). This presses the engagement protrusions (33) inward, and as a result the securing tabs (32) are spread apart.

The disassembly tool (30) has a guard device in the form of a collarlike guard edge (25), which will now be described in further detail. The guard edge (25) serves to secure the plug (3) axially when the coolant lines, coupled together by the coolant coupling, are still under pressure during disassembly. In that case, the plug (3) would in fact, once the spring ring (31) acting as a closure clamp is loosened, be pushed axially rearward at high pressure, so that coolant could escape uncontrolled from the coolant loop. An uncontrolled rearward spin or movement of the plug (3) could cause damage or injury as well. The disassembly tool (30) with the guard device is a half-shell-like, stable component that is provided with a retainer edge (24) on one end face and with the guard edge (25) on the opposite end face, both edges protruding radially inward. The retaining edge (24) is part of a groovelike indentation in the region of the inner wall of the disassembly tool (30), which is adapted to the outer contour of the closure ring (5A). As a result, the half-shell-like disassembly tool (30) can be seated axially positively against the closure ring (5A). The radial height of the protective collar (11) and the radial depth of the guard edge (25)—in each case with respect to the center longitudinal axis of the coolant coupling—overlap in the axial direction, so that the guard edge (25) is located in the axial direction of motion of the protective collar (11). The axial spacing (23) between the guard edge (25) and the protective collar (11) is less than the axial length of the combination ring (7) and is equivalent to the spacing between the end face of the plug (3) and the sealing ring (12a), so that after disassembly of the spring ring (31), even though the plug (3) is still positioned in the combination ring (7), it is nevertheless no longer clamped by the sealing ring (12a). As a result, even after loosening of the closure clamp, the plug (3) cannot be removed from the sleeve (4) as long as the guard edge (25) axially secures the plug (3).

The coolant couplings of FIGS. 1–3 and FIGS. 4–6 are provided with a positive means of preventing relative rotation, so that the plug (3) and sleeve (4) can be inserted into one another only in a defined position. To that end, an axial groove (21) is provided in the collar (10) of the sleeve (4). A corresponding groove, which however, is not identified by reference numeral, is also provided in the protective collar (11). Correspondingly, at the level of the collar (10), the closure ring (5A) has a cam (22) that in the assembled position engages the axial groove (21). In the same way, at the level of the protective collar (11), the closure ring (5A) has a further cam, which engages the axial groove of the protective collar (11). Relative rotation of the plug (3) and sleeve (4) in the assembled state is therefore not possible.

Figure 8:
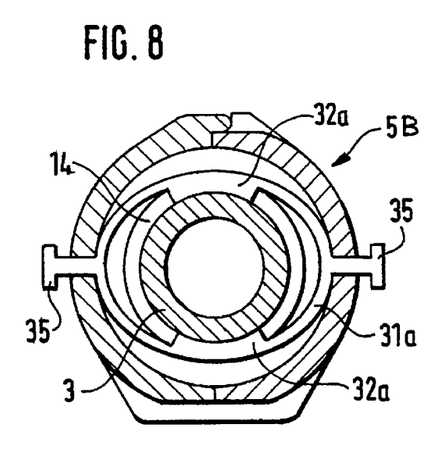
FIG. 8, in a cross section, shows a further embodiment similar to FIGS. 5 and 6, in which the closure clamp is provided with engagement protrusions, protruding radially past the outside of the closure ring, for spreading open the closure clamp.
Figure 10:
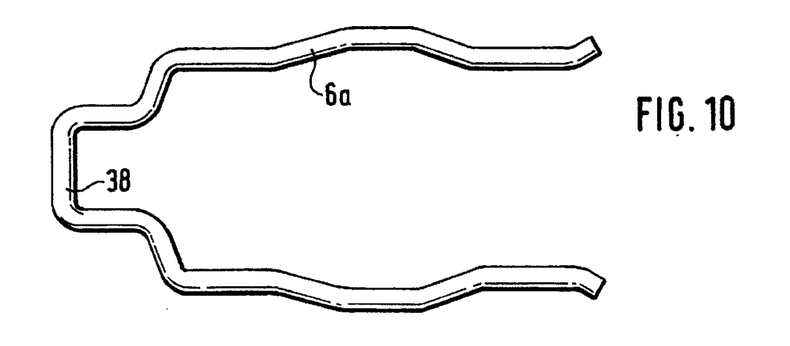
FIG. 10 shows a closure clamp similar to FIG. 2, bent in a U, which is provided with an outward bulge for the engagement of a tool.

A closure clamp (6a) in the embodiment of FIG. 10 is essentially equivalent to the U-shaped closure clamp (6) of FIG. 2. However, the closure clamp (6a) is additionally provided with a small, likewise U-shaped outward bulge (38), which serves as an engagement face for a tool. This makes it possible for the closure clamp (6a) to be pulled out of the closure ring (5) in a simple way using a suitable tool, which in the embodiment of FIG. 2 can be done only by pressing a forklike tool against the ends of both legs of the closure clamp (6) on the side of the openings (19). Simplified disassembly of the closure clamp (6a) is therefore possible as a result of the bulge (38). The closure clamp of FIG. 8, embodied as a spring ring (31a), is nearly identical to the spring ring (31) of FIGS. 4–6. In the embodiment of FIG. 8, the engagement protrusions protruding into the openings of the closure ring (4) are merely provided with heads (35), which are located outside the outer contour of the closure ring (5A) and are spaced radially apart from the outer contour of the closure ring (5A). This makes it possible for the two heads (35) to be pressed together by a manual action, for instance by exerting pressure with the middle finger and thumb of one hand, as a result of which the securing tabs (32a) of the spring ring (31a) can be spread apart to release the plug (3).

Figure 9:
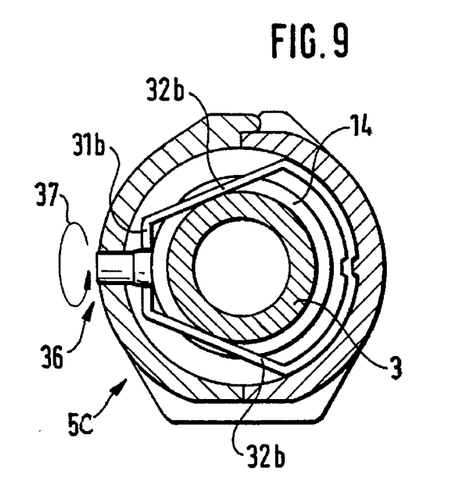
FIG. 9, in a cross section, shows a further embodiment of a closure clamp in the form of a spring ring, integrated with a closure ring and spreadable open by means of a screwdriver that can engage it from outside.

The embodiment of FIG. 9 has a further closure clamp, likewise embodied as a closed spring ring (31b). The spring ring (31b) has an annular segment, resting in the annular groove of the closure ring (5C), and two legs (32b) that serve to axially support the termination edge (14) of the plug (3). The two legs (32b) are joined together at the level of an eccentric element (36) that is rotatably supported in the wall of the closure ring (5C). By rotating the eccentric element (36) in the direction of the arrow (37), the two legs (32b) are therefore spread apart, thereby axially releasing the plug (3). The eccentric element (36) is embodied in the form of a blocklike quadrilateral whose length is substantially greater than its width. If the eccentric element (36) is therefore rotated by 90°, then it spreads the legs (32) apart not by means of its broad side—as shown—but rather by means of its long side, and as a result the legs release the plug (3).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fluid coupling for connecting fluid lines, comprising:

a connector plug comprising a free face end at an axial end thereof and a widened insertion collar on an outer periphery thereof, said insertion collar being a first axial distance from said free face end;

a connector sleeve comprising a receiving region into which said plug is axially insertable and a stop edge axially facing said plug; and a closure arrangement for axially and radially securing the plug and the sleeve in an radially and axially fixed position, said closure arrangement including an annular combination element comprising an end edge at an axial end thereof, at least one elastic sealing element on an inner periphery thereof, and a radially widened segment on an inner periphery thereof, said widened segment being a second axial distance from said end edge, said second axial distance being a small distance greater than said first axial distance, said annular combination element being force lockingly and tightly fitted into said receiving region of the sleeve such that said end edge of the annular combination element abuts said stop edge of the sleeve, said plug being axially insertable into said annular combination element such that in an assembled position said insertion collar of the plug abuts said widened segment of the annular combination element and such that said free face end of the plug is spaced at said small distance from said stop edge of the sleeve.

2. The fluid coupling of claim 1, wherein the annular combination element is made of plastic and has at least two annular grooves on said inner periphery that are axially offset from one another.

3. The fluid coupling of claim 1, wherein the annular combination element is provided with two sets of two annular grooves, offset axially from one another, one set being on an outer periphery and the other set being on said inner periphery.

4. The fluid coupling of claim 1, wherein the closure arrangement comprises a means for preventing relative rotation of the plug and sleeve during axial insertion of the plug into the sleeve.

5. The fluid coupling of claim 1, wherein said insertion collar of the connector plug conically narrows in an axial direction toward said free face end of the plug, and said widened segment of the annular combination element conically narrows in an axial direction toward said end edge.

6. The fluid coupling of claim 1, wherein said fluid lines are coolant lines for use in motor vehicles.

7. A fluid coupling for connecting fluid lines, comprising:

a connector plug sealingly connectable to a first fluid line;

a connector sleeve sealingly connectable to a second fluid line, said plug being insertable into the sleeve in an axial direction; and a closure arrangement for axially securing the plug and sleeve in an interlocked position;

wherein the closure arrangement includes an annular combination element of a nonconductive material provided between the plug and the sleeve, which combination element keeps the plug radially centered and axially positioned in the sleeve without contact between the plug and sleeve, which combination element essentially positively fills up the sleeve in order to stably support the plug in the sleeve, said combination element having at least one sealing element supported on an inner periphery, and wherein the closure arrangement is provided with a closure ring held axially positively on the sleeve, in which closure ring a closure clamp is bound in captive fashion, which closure clamp can be radially spread apart for the sake of axial insertion and removal of the plug and which clamp axially positively locks the plug in the sleeve in the interlocked position.

8. The fluid coupling of claim 7, wherein the closure ring has two half-shells that can be releasably joined with one another.

9. The fluid coupling of claim 8, wherein the closure clamp is embodied as a spring ring that is provided with a closed cross section and in the assembled state encompasses the plug, which spring ring is supported on an inside wall of the closure ring and has at least one engagement element, accessible from an outside of the closure ring, for loosening the closure clamp.

10. The fluid coupling of claim 9, wherein two engagement protrusions are provided as the engagement element on two opposed sides of the spring ring, which protrusions protrude radially to the outside through the wall of the closure ring.

11. The fluid coupling of claim 10, comprising a half-shell-like disassembly tool, which tool can be seated on the closure ring and which for loosening the spring ring is provided with two cams protruding radially inward at the height of the engagement protrusions.

12. The fluid coupling of claim 11, wherein the disassembly tool is provided with a guard edge for positive axial securing of the plug during disassembly, which edge protrudes radially inward to beyond the radial height of a protective collar of the plug and which in the disassembly, in the seated state, is disposed with axial spacing from the protective collar.

13. The fluid coupling of claim 12, wherein the axial spacing between the protective collar and the guard edge is less than the axial length of the combination element.

14. The fluid coupling of claim 8, wherein the two half-shells are pivotably joined together on one side by means of a hinge connection and on the opposite side can be annularly closed by means of a detent connection.

15. The fluid coupling of claim 14, wherein the hinge connection has at least two detent elements which can lock in detent fashion positively with one another and are pivotable relative to one another, one being disposed on the one and the other being disposed on the other half-shell.

16. The fluid coupling of claim 7, wherein the closure clamp is embodied as an essentially U-shaped, elastically spreadable bail.

17. The fluid coupling of claim 16, wherein the U-shaped bail is provided with an outward bulge serving as an engagement face for a tool.

18. The fluid coupling of claim 16, wherein the closure clamp is retained in countersunk fashion in the closure ring, and the free ends of the U-shaped bail of the closure clamp are accessible by means of a tool through two openings in the closure ring.

19. A fluid coupling for connecting fluid lines, comprising:

a connector plug sealingly connectable to a first fluid line, said plug comprising a free face end at an axial end thereof and a radially widened insertion collar on an outer periphery thereof, said insertion collar being a first axial distance from said free face end;

a connector sleeve sealingly connectable to a second fluid line, said sleeve comprising a receiving region into which said plug is axially insertable and a stop edge axially facing said plug; and a closure arrangement for axially and radially securing the plug and the sleeve in an interlocked position, said closure arrangement including an annular combination element comprising an end edge at an axial end thereof, at least one elastic sealing element on an inner periphery thereof, and a radially widened segment on an inner periphery thereof, said widened segment being a second axial distance from said end edge and corresponding in shape to said insertion collar of said plug, said second axial distance being a small distance greater than said first axial distance, said annular combination element being fitted into said receiving region of the sleeve such that said end edge of the annular combination element abuts said stop edge of the sleeve, said plug being axially insertable into said annular combination element such that in an assembled position said insertion collar of the plug abuts said widened segment of the annular combination element and such that said free face end of the plug is spaced at said small distance from said stop edge of the sleeve, said annular combination element being formed of a nonconductive and dimensionally-stable material in order to maintain the plug radially centered and axially positioned in the sleeve without contact between the plug and sleeve.

20. The fluid coupling of claim 19, wherein said insertion collar of the connector plug conically narrows in an axial direction toward said free face end of the plug, and said widened segment of the annular combination element conically narrows in an axial direction toward said end edge.

* * * * *

UNITED STATES PATENT AND TRADEMARK OFFICE
CERTIFICATE OF CORRECTION

PATENT NO. : 5,653,475
DATED : August 5, 1997
INVENTOR(S) : Ulrich SCHEYHING et al.

It is certified that error appears in the above-indentified patent and that said Letters Patent is hereby corrected as shown below:

Title page, item [54] and col. 1:    change "COLLANT COUPLING FOR CONNECTING COOLANT LINES" to --COOLANT COUPLING FOR CONNECTING COOLANT LINES--.

Signed and Sealed this

Tenth Day of February, 1998

Attest:

BRUCE LEHMAN

Attesting Officer         Commissioner of Patents and Trademarks